(12) United States Patent
Kreichauf et al.

(10) Patent No.: US 12,360,249 B2
(45) Date of Patent: Jul. 15, 2025

(54) SYSTEMS AND METHODS USING KALMAN FILTER MONITORS TO DETECT SPOOFED GNSS SIGNALS

(71) Applicant: Honeywell International Inc., Charlotte, NC (US)

(72) Inventors: Ruth Dagmar Kreichauf, River Falls, WI (US); Reed R May, Seminole, FL (US)

(73) Assignee: Honeywell International Inc., Charlotte, NC (US)

(*) Notice: Subject to any disclaimer, the term of this patent is extended or adjusted under 35 U.S.C. 154(b) by 299 days.

(21) Appl. No.: 17/872,986

(22) Filed: Jul. 25, 2022

(65) Prior Publication Data

US 2024/0027628 A1    Jan. 25, 2024

(51) Int. Cl.
  *G01S 19/21*    (2010.01)
  *G01S 19/39*    (2010.01)
  *G01S 19/47*    (2010.01)

(52) U.S. Cl.
  CPC .......... *G01S 19/215* (2013.01); *G01S 19/393* (2019.08); *G01S 19/47* (2013.01)

(58) Field of Classification Search
  None
  See application file for complete search history.

(56) References Cited

U.S. PATENT DOCUMENTS 7,724,184 B2    5/2010  Waid
9,121,940 B2 *  9/2015  Psaiki .................. G01S 19/215
(Continued)

FOREIGN PATENT DOCUMENTS

CN    110715660 A    1/2020
CN    112902967 A    6/2021
(Continued)

OTHER PUBLICATIONS

Kujur et al., "A Solution Separation Monitor using INS for Detecting GNSS Spoofing," Proceedings of the 33rd International Technical Meeting of the Satellite Division of The Institute of Navigation (ION GNSS+ 2020), Sep. 2020, pp. 3210 through 3226, https://doi.org/10.33012/2020.17535.
(Continued)

*Primary Examiner* — Bernarr E Gregory
(74) *Attorney, Agent, or Firm* — Fogg & Powers LLC

(57) ABSTRACT

A system comprises a GNSS receiver that receives a GNSS signal and produces GNSS measurements; a plurality of inertial sensors that produce inertial data; and a navigation system comprising a Kalman filter and an inertial navigation unit. The Kalman filter receives the GNSS measurements and calculates pseudo-range residuals, delta-range residuals, pseudo-range chi square values, delta-range chi square values, accelerometer bias estimates, and gyroscope bias estimates. A spoof detection system communicates with the Kalman filter and comprises a set of detection monitors that determine an integrity of the GNSS measurements. The detection monitors detect if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is abnormal. When one or more of the detection monitors indicates that the GNSS signal is abnormal, a spoof event alert is outputted.

20 Claims, 3 Drawing Sheets

(56) References Cited

U.S. PATENT DOCUMENTS

| | | | |
|---|---|---|---|
| 9,658,341 | B2 | 5/2017 | Mathews et al. |
| 10,094,930 | B2 | 10/2018 | Schipper et al. |
| 10,495,759 | B2 | 12/2019 | Leibner et al. |
| 2011/0102259 | A1* | 5/2011 | Ledvina ................ G01S 19/215 342/357.59 |
| 2011/0257927 | A1 | 10/2011 | Bharadwaj et al. |
| 2014/0253375 | A1* | 9/2014 | Rudow ................ G01S 19/485 342/357.51 |
| 2020/0371248 | A1* | 11/2020 | Stein ........................ G01S 19/07 |
| 2022/0066044 | A1 | 3/2022 | McDonald et al. |
| 2022/0196851 | A1* | 6/2022 | Li .......................... G01S 19/072 |

FOREIGN PATENT DOCUMENTS

| | | |
|---|---|---|
| CN | 113985451 A | 1/2022 |
| CN | 114114330 A | 3/2022 |
| EP | 3109670 A1 | 12/2016 |

OTHER PUBLICATIONS

Tanil, et al., "An INS Monitor Against GNSS Spoofing Attacks During GBAS and SBAS-assisted Aircraft Landing Approaches, " Proceedings of the 29th International Technical Meeting of the Satellite Division of The Institute of Navigation (ION GNSS+ 2016), Portland, Oregon, Sep. 2016, pp. 2981 through 2990, https://doi.org/10.33012/2016.14779.

Tanil, et al., Experimental Validation of INS Monitor against GNSS Spoofing, Conference Paper, Oct. 2018, pp. 1 through 16, uploaded Oct. 7, 2018 from ResearchGate.

European Patent Office, "Extended European Search Report", from EP Application No. 23174461.6, from Foreign Counterpart to U.S. Appl. No. 17/872,986, Jan. 8, 2024, pp. 1 through 11, Published: EP.

Liu et al., "Impact Assessment of GNSS Spoofing Attacks on INS/GNSS Integrated Navigation System", Sensors, May 4, 2018, vol. 18, No. 1433, pp. 1 through 20.

* cited by examiner

SYSTEMS AND METHODS USING KALMAN FILTER MONITORS TO DETECT SPOOFED GNSS SIGNALS

STATEMENT REGARDING FEDERALLY SPONSORED RESEARCH OR DEVELOPMENT

This invention was made with Government support under FA8576-20-C-0001 awarded by United States Airforce. The Government has certain rights in the invention.

BACKGROUND

During a spoofing attack, a nearby radio transmitter sends fake global navigation satellite system (GNSS) signals into a target GNSS receiver. This interference makes the GNSS receiver believe it is at a false location. The GNSS receiver then creates false measurements, which include line-of-sight pseudo range and delta range, as well as clock information. These false measurements are provided to a navigation system, which drives a navigation solution's estimated positions and velocities to the same false location, unless the spoofing attack is detected and mitigated in a timely fashion.

Accordingly, there is a need for spoofing detection systems and methods to minimize the impact of spoofing attacks.

SUMMARY

A system and method to detect spoofed global navigation satellite system (GNSS) signals is disclosed. The system comprises one or more aiding sensors onboard a vehicle, the one or more aiding sensors comprising a GNSS receiver operative to receive a GNSS signal and produce GNSS measurements, including pseudo-range data and delta-range data; a plurality of inertial sensors onboard the vehicle and operative to produce inertial data, the inertial sensors including at least one accelerometer and at least one gyroscope; and an onboard navigation system comprising a Kalman filter and an inertial navigation unit operatively coupled to the Kalman filter, the inertial navigation unit operative to receive the inertial data from the inertial sensors and calculate an inertial navigation solution for the vehicle. The Kalman filter is operative to receive the GNSS measurements from the GNSS receiver, and to calculate pseudo-range residuals, delta-range residuals, pseudo-range chi square values, delta-range chi square values, accelerometer bias estimates, and gyroscope bias estimates.

A spoof detection system is in operative communication with the Kalman filter and comprises a set of detection monitors operative to determine an integrity of the GNSS measurements. The detection monitors comprise a pseudo-range residual monitor operative to receive the pseudo-range residuals from the Kalman filter, and to statistically track the pseudo-range residuals; a delta-range residual monitor operative to receive the delta-range residuals from the Kalman filter, and to statistically track the delta-range residuals; a pseudo-range chi-square monitor operative to receive the pseudo-range chi square values from the Kalman filter, and to statistically track the pseudo-range chi square values; a delta-range chi-square monitor operative to receive the delta-range chi square values from the Kalman filter, and to statistically track the delta-range chi square values; an accelerometer bias monitor operative to receive the accelerometer bias estimates from the Kalman filter; and a gyroscope bias monitor operative to receive the gyroscope bias estimates from the Kalman filter. The detection monitors are each configured to respectively detect if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is in an abnormal state. When one or more of the detection monitors indicates that the GNSS signal is in an abnormal state, the spoof detection system outputs a spoof event alert.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods using Kalman filter monitors to detect spoofed global navigation satellite system (GNSS) signals are described herein.

Figure 1:
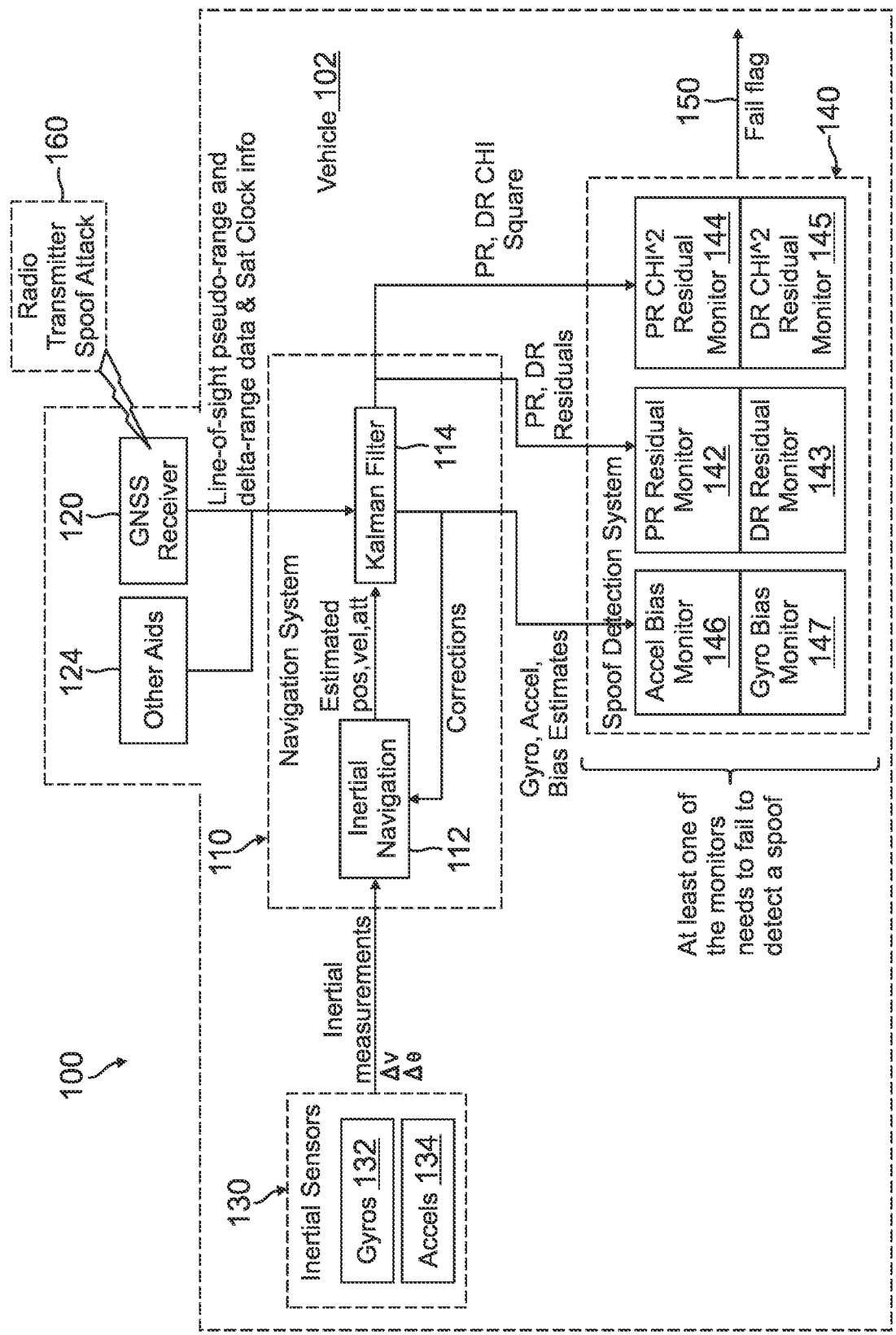
FIG. 1 is a block diagram of a system to detect GNSS spoofing attacks, according to one embodiment.

FIG. 1 is a block diagram of a system 100 to detect GNSS spoofing attacks, according to one embodiment. The system 100 generally includes a navigation system 110 onboard a vehicle 102, such as an aircraft or a ground vehicle; an onboard GNSS receiver 120 operative to receive GNSS signals and produce GNSS measurements for vehicle 102; a set of onboard inertial sensors 130 operative to produce inertial data for vehicle 102; and an onboard spoof detection system 140, which can be hosted in at least one processor onboard vehicle 102.

As shown in FIG. 1, navigation system 110 generally includes an inertial navigation unit 112 that calculates an inertial navigation solution for vehicle 102, and a Kalman filter 114 such as a blended Kalman filter, which is operatively coupled to inertial navigation unit 112 in a feedback loop. The Kalman filter 114 is configured to receive GNSS measurements from GNSS receiver 120, including line-of-sight pseudo-range and delta-range data, as well as satellite clock information. The Kalman filter 114 can also be configured to receive aiding data from one or more other aids 124, such as barometric data from a barometric pressure sensor, or the like.

The inertial navigation unit 112 is configured to receive inertial measurements from inertial sensors 130, such as one or more gyroscopes 132 and accelerometers 134, which can be implemented in an onboard inertial measurement unit (IMU). The gyroscopes 132 and accelerometers 134 respectively output data corresponding to changes in angle (Δθ) and changes in velocity (Δv) as a result of the trajectory motion of vehicle 102.

The inertial navigation solution output from inertial navigation unit 112 includes estimated vehicle kinematic state statistics, including position (pos), velocity (vel), and attitude (att) of vehicle 102, which are sent to Kalman filter 114 and corrected over time based on feedback from Kalman filter 114. The inertial navigation unit 112 is configured to generate the estimated vehicle kinematic state statistics based on integration of the inertial measurements from inertial sensors 130.

The inputs to spoof detection system 140 are provided by navigation system 110 and are calculated by Kalman filter 114. The inputs calculated by Kalman filter 114 include various residuals, chi-square values, and bias estimates. In particular, Kalman filter 114 is operative to calculate pseudo-range residuals, delta-range residuals, pseudo-range chi-square values, delta-range chi-square values, accelerometer bias estimates, and gyroscope bias estimates.

The spoof detection system 140 is in operative communication with Kalman filter 114, and is configured to protect navigation system 110 from GNSS spoofing events, such as a radio transmitter spoof attack 160. The spoof detection system 140 employs a plurality of detection monitors operative to determine the integrity of the GNSS measurements. Spoofing can have a systemic effect on GNSS signals that enter navigation system 110 When the GNSS signals are corrupted, the navigation solution computed by navigation system 110 will start to diverge because of the erroneous GNSS signals that are received.

The spoof detection system 140 includes a pseudo-range (PR) residual monitor 142 that is operative to receive the pseudo-range residuals from Kalman filter 114, and to statistically track the pseudo-range residuals; and a delta-range (DR) residual monitor 143 that is operative to receive the delta-range residuals from Kalman filter 114, and to statistically track the delta-range residuals. The spoof detection system 140 also includes a pseudo-range chi-square monitor 144 that is operative to receive the pseudo-range chi-square values from Kalman filter 114, and to statistically track the pseudo-range chi-square values; and a delta-range (DR) chi-square monitor 145 that is operative to receive the delta-range chi square values from Kalman filter 114, and to statistically track the delta-range chi square values. The spoof detection system 140 further includes an accelerometer bias monitor 146 that is operative to receive the accelerometer bias estimates from Kalman filter 114; and a gyroscope bias monitor 147 that is operative to receive the gyroscope bias estimates from Kalman filter 114.

The detection monitors in spoof detection system 140 can detect if the residuals, chi-square values, or bias estimates go beyond a fail threshold, indicating that the GNSS signal is in an abnormal state. For the spoof detection system 140 to declare a spoof event, at least one of the detection monitors needs to fail to detect a spoof event. In this case, an normal spoofed condition is indicated by an alert, such as through a monitor fail flag 150.

Figure 2:
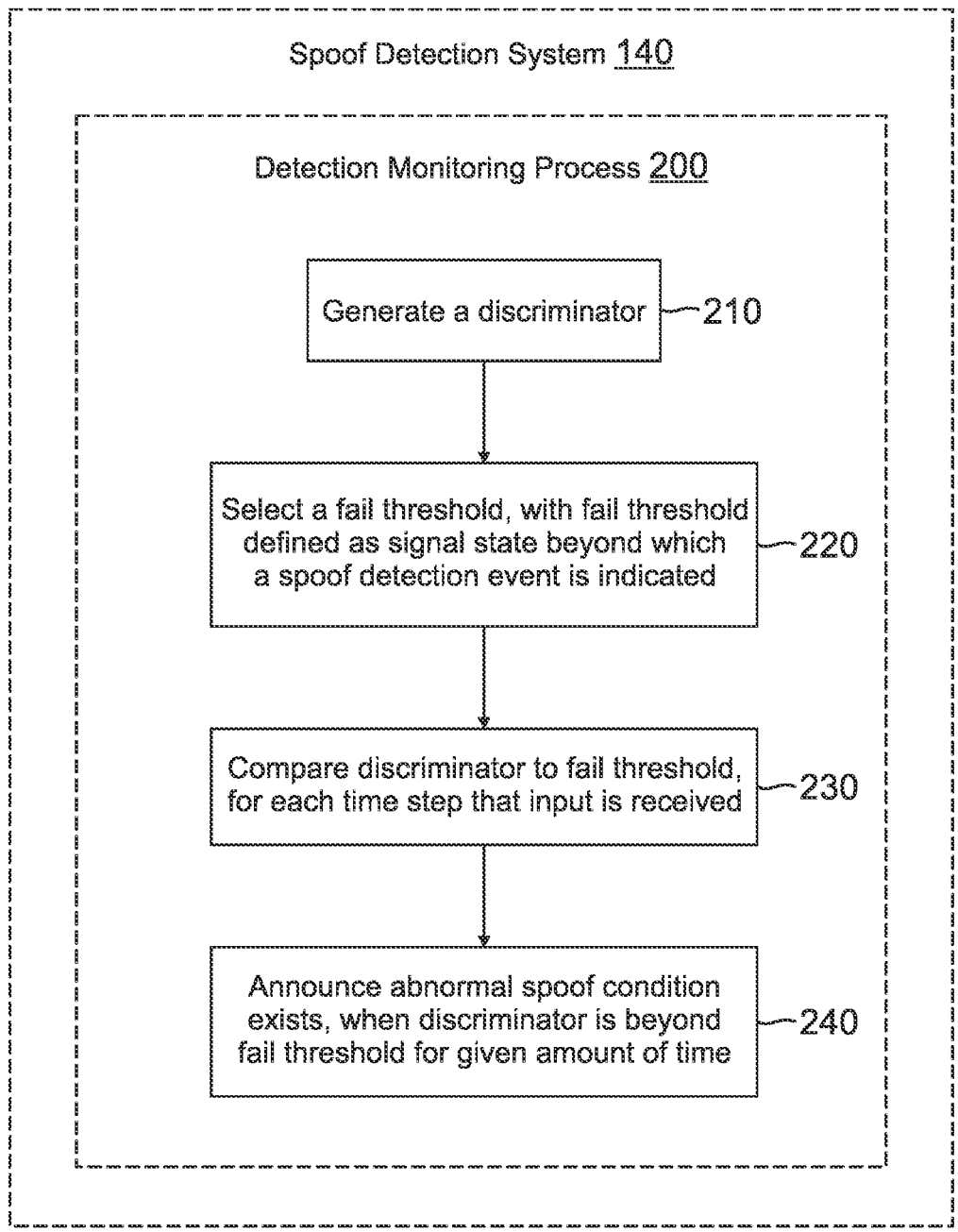
FIG. 2 is a functional flow diagram of a detection monitoring process for use in the system of FIG. 1, according to one implementation.

Each of the detection monitors in spoof detection system 140 operate in a similar fashion. FIG. 2 is a functional flow diagram of a detection monitoring process 200 for the detection monitors in spoof detection system 140, according to an example implementation. Initially, the detection monitors each process an array of inputs at every time step such inputs are provided from the Kalman filter, for example N pseudo-range residual inputs. Each of the detection monitors is operative to generate a discriminator (block 210), such as a discriminator "$D_{comp}$" as described in further detail hereafter. Each of the detection monitors is also operative to select a fail threshold, with the fail threshold defined as a signal state beyond which a spoof detection event is indicated (block 220). Each of the detection monitors is operative to compare the given discriminator to the fail threshold, for each time step that an input is received (block 230). An announcement is made that an abnormal spoof condition exists, when the discriminator is beyond the fail threshold for a given amount of time (block 240), for one or more of the detection monitors.

Figures 3A, 3B:
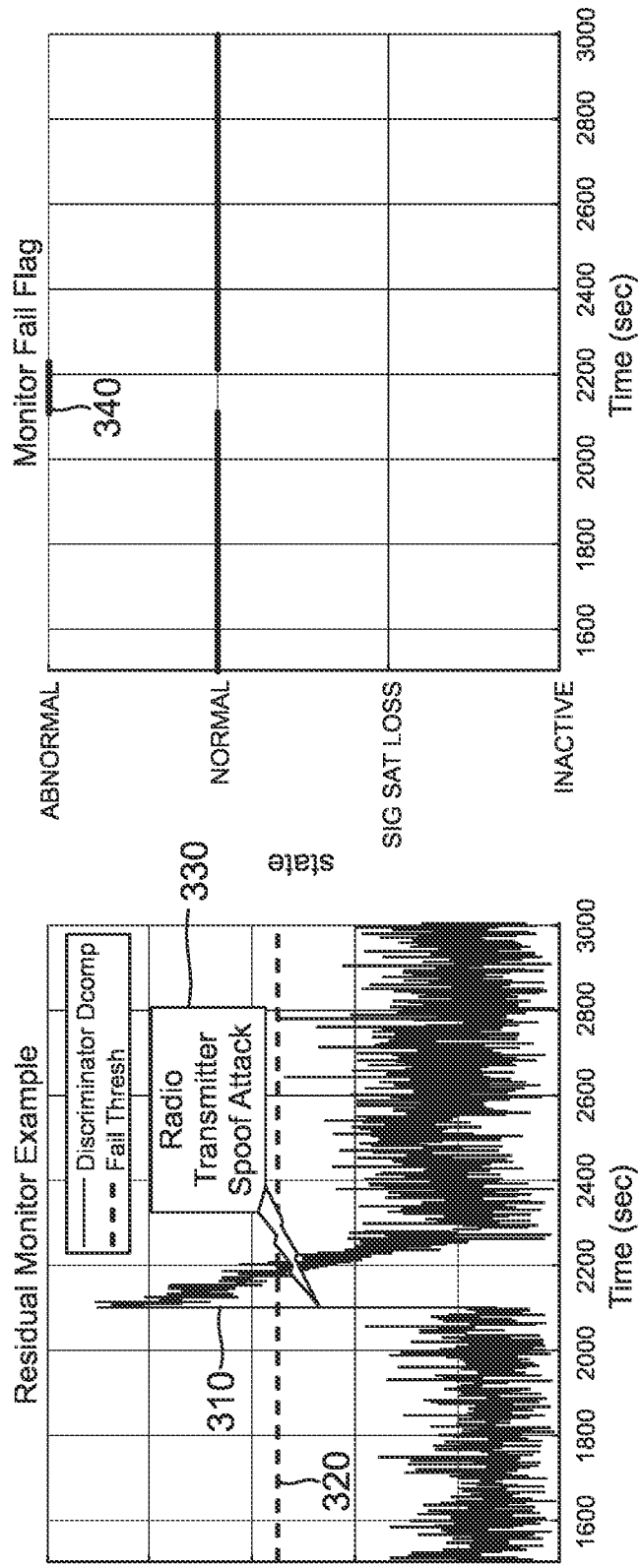
FIGS. 3A and 3B are graphical representations of the operation of a residual monitor for use in the system of FIG. 1, according to one example.

FIGS. 3A and 3B are graphical representations of the operation of a residual monitor, such as can be used in the system of FIG. 1, according to one example. As depicted in FIG. 3A, a discriminator $D_{comp}$ 310 is compared to a fail threshold 320. Once fail threshold 320 has been passed due to a radio transmitter spoof attack 330 for a given amount of time, the detection monitor announces an abnormal spoofed condition, such as by a monitor fail flag 340 as indicated in FIG. 3B.

Additional details related to the present systems and methods are described in the following sections.

Kalman Filter

The present detection monitors use the residual and chi square values produced by the Kalman filter for all valid pseudo-range and delta-range measurements to determine if the discriminator $D_{comp}$ is unexpectedly high due to spoofing. The Kalman filter includes time update steps and measurement update steps, which can be expressed in the following equations.

In the time update step:

$$x_{k\_} = \Phi_{k-1}^{k} x_{k\_}\text{reset; and}$$

$$P_{k\_} = \Phi_{k-1}^{k} P_k (\Phi_{k-1}^{k})^T + Q;$$

where:
k is the time step;
$x_k$ is the Kalman filter states;
$\Phi_k$ is the state transition matrix;
$P_k$ is the covariance matrix; and
Q is the process noise.

In the measurement update step (e.g., k @ 1 Hz):

$$K = P_{k\_} * H^{T*inv}(H * P_{k\_} * H^T + R);$$

$$\Delta x = x_{k\_} + K * (y_k - H * x_{k\_}) = x_{k\_} + K * \text{residual; and}$$

$$P_k = (I - K*H) * P_k * (I - K*H)^T + K*R*K^T;$$

where:
H is the measurement matrix;
K is the Kalman gain;
$y_k$ is the measurements (including GNSS pseudo-range and delta-range);
R is measurement noise; and
I is identity.

In addition, Δx contains the gyroscope and accelerometer measurements; and residual contains the GNSS pseudo-range and delta-range residuals. The chi-square values are computed from the residual values.

Residual Monitors and Chi-Square Monitors

This section describes the residual monitor and chi-square test monitor algorithm. The detection monitors use the residual and chi-square values produced by the Kalman filter for all valid pseudo-range or delta-range measurements to determine if the discriminator $D_{comp}$ is unexpectedly high due to spoofing. The monitor computes the following quantities:

$$D_{comp} = \sqrt{abs(RMS^2_{window}(X) - Filt^2_k(RMS_{window}(X)))} \sim \sqrt{RMS^2_k(X) - \mu^2} = \sigma(X)$$

such that:

$$RMS_{window}(X) = \frac{\Sigma_{valid\,meas} X_{window}(valid)^2}{numMeas} = RMS\ X\ \text{over a window of time;}$$

where:
RMS is the root mean square value of X; and
X is the number of valid pseudo-range residuals, delta-range residuals, pseudo-range chi-square values, or delta-range chi-square values, from the Kalman filter at each time step k.

In addition, the following expression applies:

$$Filt_k(RMS) = K*[RMS_{k-1} + RMS_{k-2} - 2*Filt_{k-1}(RMS)] + (RMS)$$

such that:

$$f = 1/(2*pi*tau);$$
$$w0 = 2*pi*f = \text{break frequency; and}$$
$$K = w0 / \left(\frac{2}{dt} + w0\right).$$

The parameter Filt(RMS) is a filtered average of the RMS values with a tau second time constant and sample time dt (e.g., 1 second). This time constant allows the filter to generally track the average RMS value while not responding too quickly to changes. The advantage of using the $D_{comp}$ difference as the discriminator is that it compensates for common mode conditions and is independent from particular configurations.

Accelerometer and Gyroscope Bias Monitors

This section describes the accelerometer bias monitor and the gyroscope bias monitor algorithm. These monitors use the Kalman filter estimated accelerometer and gyroscope bias values to determine if the discriminator $D_{comp}$ is unexpectedly high due to spoofing. The accelerometer and gyroscope bias monitors detect if the bias values change as a group and go beyond a threshold indicating whether a GNSS signal is in an abnormal state.

The accelerometer and gyroscope bias monitors compute the following quantities:

$$B_k = \text{Bias}(k) - \text{Bias}(k-1)$$

such that:

$$X = STD_k(B) = \frac{\Sigma_N (B_k - \text{mean}(B_k))^2}{N-1}.$$

The parameter B is the three gyroscope bias or accelerometer bias difference quantities from the Kalman filter at each time step k. The discriminator $D_{comp}$ is defined as:

$$D_{comp} = Y_{filt\_k} = K*[X_{k-1} + X_{k-2} - 2*Y_{filt\_k-1}] + Y_{filt\_k-1}$$

such that:

$$f = 1/(2*pi*tau);$$
$$w0 = 2*pi*f = \text{break frequency; and}$$
$$K = w0 / \left(\frac{2}{dt} + w0\right).$$

The discriminator $D_{comp}$ uses a tau second filter time constant and a sample time dt (e.g., 1 second).

The processing units and/or other computational devices used in the systems and method described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: one or more aiding sensors onboard a vehicle, the one or more aiding sensors comprising a Global Navigation Satellite System (GNSS) receiver operative to receive a GNSS signal and produce GNSS measurements, including pseudo-range data and delta-range data; a plurality of inertial sensors onboard the vehicle and operative to produce inertial data, the inertial sensors including at least one accelerometer and at least one gyroscope; an onboard navigation system comprising a Kalman filter, and an inertial navigation unit operatively coupled to the Kalman filter, the inertial navigation unit operative to receive the inertial data from the inertial sensors and calculate an inertial navigation solution for the vehicle; wherein the Kalman filter is operative to receive the GNSS measurements from the GNSS receiver; wherein the Kalman filter is operative to calculate pseudo-range residuals, delta-range residuals, pseudo-range chi square values, delta-range chi square values, accelerometer bias estimates, and gyroscope bias estimates; and a spoof detection system in operative communication with the Kalman filter, the spoof detection system comprising a set of detection monitors operative to determine an integrity of the GNSS measurements, wherein the detection monitors comprise: a pseudo-range residual monitor operative to receive the pseudo-range residuals from the Kalman filter, and to statistically track the pseudo-range residuals; a delta-range residual monitor operative to receive the delta-range residuals from the Kalman filter, and to statistically track the delta-range residuals; a pseudo-range chi-square monitor operative to receive the pseudo-range chi square values from the Kalman filter, and to statistically track the pseudo-range chi square values; a delta-range chi-square monitor operative to receive the delta-range chi square values from the Kalman filter, and to statistically track the delta-range chi square values; an accelerometer bias monitor operative to receive the accelerometer bias estimates from the Kalman filter; and a gyroscope bias monitor operative to receive the gyroscope bias estimates from the Kalman filter; wherein the detection monitors are each configured to respectively detect if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is in an abnormal state; wherein when one or more of the detection monitors indicates that the GNSS signal is in an abnormal state, the spoof detection system outputs a spoof event alert.

Example 2 includes the system of Example 1, wherein each of the detection monitors is operative to perform a process comprising: generate a discriminator; select a fail threshold, with the fail threshold defined as a signal state beyond which a spoof detection event is indicated; compare the discriminator to the fail threshold, for each time step that an input from the Kalman filter is received; and announce an abnormal spoof condition exists, when the discriminator is beyond the fail threshold for a given amount of time.

Example 3 includes the system of any of Examples 1-2, wherein the one or more aiding sensors further comprise at least one barometric pressure altitude sensor.

Example 4 includes the system of any of Examples 1-3, wherein the inertial sensors are implemented in an onboard inertial measurement unit (IMU).

Example 5 includes the system of any of Examples 1-4, wherein the inertial navigation solution for the vehicle comprises estimated vehicle kinematic state statistics including position, velocity, and attitude, which are sent to the Kalman filter and corrected over time based on feedback from the Kalman filter.

Example 6 includes the system of any of Examples 1-5, wherein: the Kalman filter comprises a blended Kalman filter; and the inertial navigation unit is configured to receive state corrections from the blended Kalman filter.

Example 7 includes the system of any of Examples 1-6, wherein the vehicle is an aircraft.

Example 8 includes the system of any of Examples 1-6, wherein the vehicle is a ground vehicle.

Example 9 includes a method comprising: providing a spoof detection system in operative communication with a navigation system onboard a vehicle, the navigation system comprising a Kalman filter and an inertial navigation unit operatively coupled to the Kalman filter, wherein the spoof detection system includes a plurality of detection monitors operatively coupled to the Kalman filter; sending inertial data for the vehicle to the inertial navigation unit, from a plurality of inertial sensors onboard the vehicle, the inertial sensors including at least one accelerometer and at least one gyroscope; receiving a Global Navigation Satellite System (GNSS) signal in a GNSS receiver onboard the vehicle; sending GNSS measurements for the vehicle from the GNSS receiver to the Kalman Filter, the GNSS measurements including pseudo-range data and delta-range data, wherein the Kalman filter calculates pseudo-range residuals, delta-range residuals, pseudo-range chi square values, delta-range chi square values, accelerometer bias estimates, and gyroscope bias estimates; respectively detecting in the detection monitors if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is in an abnormal state; and outputting a spoof event alert from the spoof detection system when one or more of the detection monitors indicates that the GNSS signal is in an abnormal state.

Example 10 includes the method of Example 9, wherein the detection monitors comprise: a pseudo-range residual monitor that receives the pseudo-range residuals from the Kalman filter, and statistically tracks the pseudo-range residuals; a delta-range residual monitor that receives the delta-range residuals from the Kalman filter, and statistically tracks the delta-range residuals; a pseudo-range chi-square monitor that receives the pseudo-range chi square values from the Kalman filter, and statistically tracks the pseudo-range chi square values; a delta-range chi-square monitor that receives the delta-range chi square values from the Kalman filter, and statistically tracks the delta-range chi square values; an accelerometer bias monitor that receives the accelerometer bias estimates from the Kalman filter; and a gyroscope bias monitor that receives the gyroscope bias estimates from the Kalman filter.

Example 11 includes the method of any of Examples 9-10, wherein each of the detection monitors perform a process comprising: generating a discriminator; selecting a fail threshold, with the fail threshold defined as a signal state beyond which a spoof detection event is indicated; comparing the discriminator to the fail threshold, for each time step that an input from the Kalman filter is received; and announcing an abnormal spoof condition exists, when the discriminator is beyond the fail threshold for a given amount of time.

Example 12 includes the method of any of Examples 9-11, wherein the inertial sensors are implemented in an onboard inertial measurement unit (IMU).

Example 13 includes the method of any of Examples 9-12, wherein the inertial navigation unit calculates an inertial navigation solution for the vehicle.

Example 14 includes the method of Example 13, wherein the inertial navigation solution comprises estimated vehicle kinematic state statistics including position, velocity, and attitude, which are sent to the Kalman filter and corrected over time based on feedback from the Kalman filter.

Example 15 includes the method of any of Examples 9-14, wherein: the Kalman filter comprises a blended Kalman filter; and the inertial navigation unit receives state corrections from the blended Kalman filter.

Example 16 includes the method of any of Examples 9-15, wherein the vehicle is an aircraft.

Example 17 includes the method of any of Examples 9-15, wherein the vehicle is a ground vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
one or more aiding sensors onboard a vehicle, the one or more aiding sensors comprising a Global Navigation Satellite System (GNSS) receiver operative to receive a GNSS signal and produce GNSS measurements, including pseudo-range data and delta-range data;
a plurality of inertial sensors onboard the vehicle and operative to produce inertial data, the inertial sensors including at least one accelerometer and at least one gyroscope;
an onboard navigation system comprising a Kalman filter, and an inertial navigation unit operatively coupled to the Kalman filter, the inertial navigation unit operative to receive the inertial data from the inertial sensors and calculate an inertial navigation solution for the vehicle;
wherein the Kalman filter is operative to receive the GNSS measurements from the GNSS receiver;
wherein the Kalman filter is operative to calculate pseudo-range residuals, delta-range residuals, pseudo-range chi square values, delta-range chi square values, accelerometer bias estimates, and gyroscope bias estimates; and
a spoof detection system in operative communication with the Kalman filter, the spoof detection system comprising a set of detection monitors operative to determine an integrity of the GNSS measurements, wherein the detection monitors comprise:
a pseudo-range residual monitor operative to receive the pseudo-range residuals from the Kalman filter, and to statistically track the pseudo-range residuals;
a delta-range residual monitor operative to receive the delta-range residuals from the Kalman filter, and to statistically track the delta-range residuals;
a pseudo-range chi-square monitor operative to receive the pseudo-range chi square values from the Kalman filter, and to statistically track the pseudo-range chi square values;
a delta-range chi-square monitor operative to receive the delta-range chi square values from the Kalman filter, and to statistically track the delta-range chi square values;
an accelerometer bias monitor operative to receive the accelerometer bias estimates from the Kalman filter; and
a gyroscope bias monitor operative to receive the gyroscope bias estimates from the Kalman filter;
wherein the detection monitors are each configured to respectively detect if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is in an abnormal state;
wherein the residual monitors and the chi-square monitors are configured to determine if a discriminator $D_{comp1}$ is above the fail threshold by computing the following parameters:

$$D_{comp_1} = \frac{\sqrt{abs(RMS^2_{window}(X) - Filt^2_k(RMS_{window}(X)))}}{\sqrt{RMS^2_k(X) - \mu^2}} = \delta(X)$$

such that:

$$RMS_{window}(X) = \Sigma_{valid\ meas} X_{window}(valid)^2 / numMeas = RMS\ over\ a\ window\ of\ time;$$

where:
RMS is the root mean square value of X;
X is the number of valid pseudo-range residuals, delta-range residuals, pseudo-range chi-square values, or delta-range chi-square values, from the Kalman filter at each time step k, and
Filt(RMS) is a filtered average of the RMS values;
wherein when one or more of the detection monitors indicates that the GNSS signal is in an abnormal state, the spoof detection system outputs a spoof event alert.

2. The system of claim 1, wherein each of the detection monitors is operative to perform a process comprising:
generate a discriminator;
select a fail threshold, with the fail threshold defined as a signal state beyond which a spoof detection event is indicated;
compare the discriminator to the fail threshold, for each time step that an input from the Kalman filter is received; and
announce an abnormal spoof condition exists, when the discriminator is beyond the fail threshold for a given amount of time.

3. The system of claim 1, wherein the one or more aiding sensors further comprise at least one barometric pressure altitude sensor.

4. The system of claim 1, wherein the inertial sensors are implemented in an onboard inertial measurement unit (IMU).

5. The system of claim 1, wherein the inertial navigation solution for the vehicle comprises estimated vehicle kinematic state statistics including position, velocity, and attitude, which are sent to the Kalman filter and corrected over time based on feedback from the Kalman filter.

6. The system of claim 1, wherein:
the Kalman filter comprises a blended Kalman filter; and
the inertial navigation unit is configured to receive state corrections from the blended Kalman filter.

7. The system of claim 1, wherein the vehicle is an aircraft.

8. The system of claim 1, wherein the vehicle is a ground vehicle.

9. The system of claim 1, wherein the accelerometer bias monitor and the gyroscope bias monitor are configured to compute the following parameters:

$$B_k = Bias(k) - Bias(k-1)$$

such that:

$$X = STD_k(B) = \Sigma_N (B_k - mean(B_k))^2 / N - 1$$

where:
parameter B includes gyroscope bias or accelerometer bias difference quantities from the Kalman filter at each time step k.

10. The system of claim 9, wherein the accelerometer bias monitor and the gyroscope bias monitor are configured to determine if a discriminator $D_{comp2}$ is above the fail threshold by computing the following parameters:

$$D_{comp2}=Y_{filt\_k}=K*[X_{k-1}+X_{k-2}-2*Y_{filt\_k-1}]+Y_{filt\_k-1}$$

such that:

$$f=1/(2*pi*tau);$$

$$w0=2*pi*f=\text{break frequency; and}$$

$$K=w0/(2/dt+w0)$$

where:
the discriminator $D_{comp2}$ uses a tau second filter time constant and a sample time dt.

11. A method comprising:
providing a spoof detection system in operative communication with a navigation system onboard a vehicle, the navigation system comprising a Kalman filter and an inertial navigation unit operatively coupled to the Kalman filter, wherein the spoof detection system includes a plurality of detection monitors operatively coupled to the Kalman filter;
sending inertial data for the vehicle to the inertial navigation unit, from a plurality of inertial sensors onboard the vehicle, the inertial sensors including at least one accelerometer and at least one gyroscope;
receiving a Global Navigation Satellite System (GNSS) signal in a GNSS receiver onboard the vehicle;
sending GNSS measurements for the vehicle from the GNSS receiver to the Kalman Filter, the GNSS measurements including pseudo-range data and delta-range data, wherein the Kalman filter calculates pseudo-range residuals, delta-range residuals, pseudo-range chi square values, delta-range chi square values, accelerometer bias estimates, and gyroscope bias estimates;
respectively detecting in the detection monitors if the pseudo-range residuals, the delta-range residuals, the pseudo-range chi-square values, the delta-range chi-square values, the accelerometer bias estimates, or the gyroscope bias estimates, go beyond a fail threshold indicating that the GNSS signal is in an abnormal state;

$$D_{comp}=\sqrt{abs(RMS^2_{window}(X)-Filt^2_k(RMS_{window}(X)))} \sim$$
$$\sqrt{RMS^2_k(X)-\mu^2}=\delta(X)$$

such that:

$$RMS_{window}(X)=\Sigma_{valid\ meas}X_{window}(valid)^2/\text{numMeas}=\text{RMS over a window of time};$$

where:
RMS is the root mean square value of X;
X is the number of valid pseudo-range residuals, delta-range residuals, pseudo-range chi-square values, or delta-range chi-square values, from the Kalman filter at each time step k, and
Filt(RMS) is a filtered average of the RMS values; and
outputting a spoof event alert from the spoof detection system when one or more of the detection monitors indicates that the GNSS signal is in an abnormal state.

12. The method of claim 11, wherein the detection monitors comprise:
a pseudo-range residual monitor that receives the pseudo-range residuals from the Kalman filter, and statistically tracks the pseudo-range residuals;
a delta-range residual monitor that receives the delta-range residuals from the Kalman filter, and statistically tracks the delta-range residuals;
a pseudo-range chi-square monitor that receives the pseudo-range chi square values from the Kalman filter, and statistically tracks the pseudo-range chi square values;
a delta-range chi-square monitor that receives the delta-range chi square values from the Kalman filter, and statistically tracks the delta-range chi square values;
an accelerometer bias monitor that receives the accelerometer bias estimates from the Kalman filter; and
a gyroscope bias monitor that receives the gyroscope bias estimates from the Kalman filter.

13. The system of claim 12, wherein the accelerometer bias monitor and the gyroscope bias monitor are configured to compute the following parameters:

$$B_k=\text{Bias}(k)-\text{Bias}(k-1)$$

such that:

$$X=\text{STD}_k(B)=\Sigma_N(B_k-\text{mean}(B_k))^2/N-1$$

where:
parameter B includes gyroscope bias or accelerometer bias difference quantities from the Kalman filter at each time step k.

14. The system of claim 13, wherein the accelerometer bias monitor and the gyroscope bias monitor determine if a discriminator $D_{comp2}$ is above the fail threshold by computing the following parameters:

$$D_{comp2}=Y_{filt\_k}=K*[X_{k-1}+X_{k-2}-2*Y_{filt\_k-1}]+Y_{filt\_k-1}$$

such that:

$$f=1/(2*pi*tau);$$

$$w0=2*pi*f=\text{break frequency; and}$$

$$K=w0/(2/dt+w0)$$

where:
the discriminator $D_{comp2}$ uses a tau second filter time constant and a sample time dt.

15. The method of claim 11, wherein each of the detection monitors perform a process comprising:
generating a discriminator;
selecting a fail threshold, with the fail threshold defined as a signal state beyond which a spoof detection event is indicated;
comparing the discriminator to the fail threshold, for each time step that an input from the Kalman filter is received; and
announcing an abnormal spoof condition exists, when the discriminator is beyond the fail threshold for a given amount of time.

16. The method of claim 11, wherein the inertial sensors are implemented in an onboard inertial measurement unit (IMU).

17. The method of claim 11, wherein the inertial navigation unit calculates an inertial navigation solution for the vehicle.

18. The method of claim 17, wherein the inertial navigation solution comprises estimated vehicle kinematic state statistics including position, velocity, and attitude, which are sent to the Kalman filter and corrected over time based on feedback from the Kalman filter.

19. The method of claim 11, wherein:
the Kalman filter comprises a blended Kalman filter; and
the inertial navigation unit receives state corrections from the blended Kalman filter.

20. The method of claim 11, wherein the vehicle is an aircraft or a ground vehicle.

\* \* \* \* \*

UNITED STATES PATENT AND TRADEMARK OFFICE
CERTIFICATE OF CORRECTION

PATENT NO. : 12,360,249 B2
APPLICATION NO. : 17/872986
DATED : July 15, 2025
INVENTOR(S) : Kreichauf et al.

Page 1 of 1

It is certified that error appears in the above-identified patent and that said Letters Patent is hereby corrected as shown below:

In the Claims

Claim 1: At Column 10, Line 14, please insert --$X$-- between "RMS" and "over a window".

Claim 11: At Column 11, Line 42, please insert --wherein the detection monitors include residual monitors and chi-square monitors that determine if a discriminator $D_{comp1}$ is above the fail threshold by computing the following parameters:-- after "abnormal state;".

Claim 11: At Column 11, Line 49, please insert --$X$-- between "RMS" and "over a window".

Claim 13: At Column 12, Line 12, please replace "system" with --method--.

Claim 14: At Column 12, Line 24, please replace "system" with --method--.

Signed and Sealed this
Twenty-sixth Day of August, 2025

Coke Morgan Stewart
*Acting Director of the United States Patent and Trademark Office*